Sept. 26, 1939.   H. O. LINDGREN   2,174,272
MEANS FOR REGULATING DISCHARGE FROM CENTRIFUGAL SEPARATORS
Filed Aug. 13, 1935
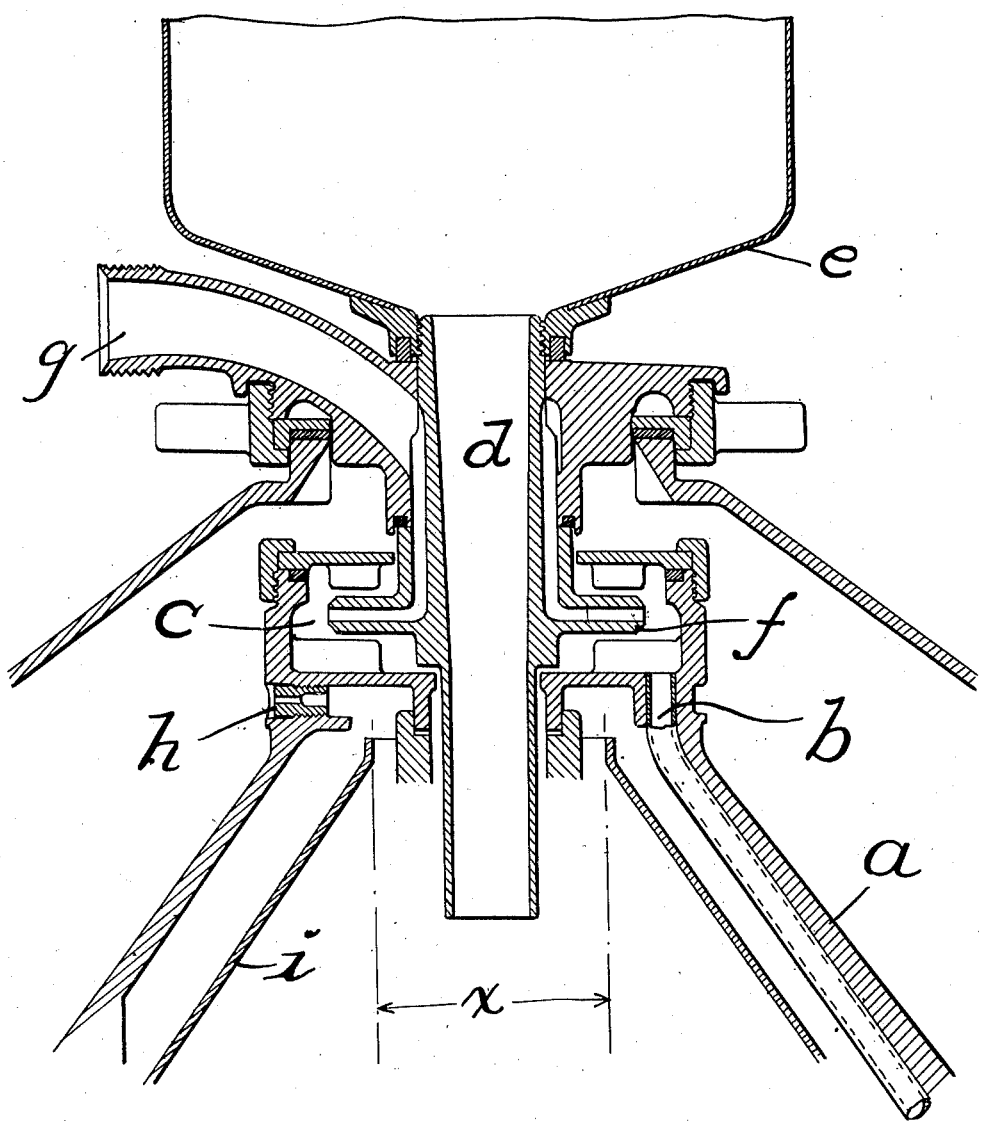
INVENTOR
Hans Olof Lindgren
BY
ATTORNEYS
WITNESS:

Patented Sept. 26, 1939

2,174,272

UNITED STATES PATENT OFFICE 2,174,272

MEANS FOR REGULATING DISCHARGE FROM CENTRIFUGAL SEPARATORS

Hans Olof Lindgren, Appelviken, Sweden, assignor to The De Laval Separator Company, New York, N. Y., a corporation of New Jersey Application August 13, 1935, Serial No. 35,959
In Sweden August 28, 1934

4 Claims. (Cl. 233—22)

In centrifugals for the separation of milk, regulating devices are required in order to provide for taking out a cream of desired concentration. Such regulating devices consist generally of elements adjustable in radial direction, by which elements the level of one of the liquids is regulated. When regulating the level of the skim milk, which is usually made by means of a screw displaceable in radial direction, the skim milk is made to stream out over the plane inner surface of the screw. When regulating the level of the cream, the turnable or radially displaceable element is usually provided with a notch, through which the cream streams out. The dimensions of the regulating device are usually such that the discharge takes place over an overflow-outlet; that is, the opening has not been quite filled by liquid. A very small drop of pressure within the bowl is sufficient to make the liquid stream out through the opening, and thus the liquid level in the bowl practically coincides with the inlet opening of the regulating device. With such an arrangement and mode of operation, a change in the velocity of the bowl or in the throughput produces a considerable alteration in the proportions between cream and skim milk. When the skim milk as well as the cream streams out through overflow-outlets, whereby is meant, as above stated, openings which are not quite filled by the outflowing liquid, these variations may not become too great. But when employing separators in which the skim milk is led out through closed pipings under pressure and the concentration of the cream can be regulated by regulating means in the skim milk pipe, the use of overflow-outlets has not been satisfactory. When using such an outlet, a small change of the counter-pressure in the skim milk pipe causes great changes in the proportions between skim milk and cream.

The present invention comprises a regulating device in centrifugal bowls by which the disadvantage in question is eliminated. The invention is characterized by the fact that the centrifugal is provided with a restricted opening for the discharge of cream, which opening is placed at such a great distance from the axis of rotation that under normal conditions the inner surface of the cream layer is positioned so far inside the opening that the cream flows out through the restricted opening in the form of a jet filling the opening. Due to the fact that a considerable amount of pressure is required to press the cream through the opening, small variations in the position of the cream level in relation to the outlet openings cause very small changes in the proportions between cream and skim milk.

The device in question offers, of course, advantages also in case the skim milk streams out freely over an overflow-outlet. It is obvious that when changing the throughput a certain displacement of the inner surface of the cream layer occurs, a change of the throughput altering the drop of pressure in the bowl necessary to make the liquid pass through the pile of discs usually contained in centrifugal bowls. In cases where the outlet openings for cream are so positioned that their inner surface nearly coincides with the inner surface of the cream layer, displacement of the inner surface of the cream layer caused in this way will, of course, bring about a considerable change in the drop of pressure and thereby a considerable change in the cream quantity streaming out through the opening. With the opening restricted and placed at a considerable distance from the inner surface of the cream layer a change of the distance of the latter from the outlet opening causes considerably smaller alterations in the outgoing cream quantity. By suitably regulating the distance of the opening from the inner surface of the cream layer, the position of which is to a considerable extent dependent on the positioning of the skim milk outlet and on the hydrodynamic losses within the bowl, it is possible to keep the above mentioned alterations within very narrow limits.

The above mentioned arrangement gives, however, the greatest advantages in centrifugals in which the cream is taken out through an open outlet, while the skim milk is discharged under pressure through pipes connected to the centrifugal bowl. The connection can be either in the form of a stuffing-box joining a fixed pipe line to the rotating bowl (see, for example, Lindgren Patent No. 1,969,226 and No. 2,002,954), or in the form of a paring device consisting of an element projecting into a chamber of the rotating bowl and connected to a fixed pipe line. Through the paring device the skim milk streams out and can be discharged under a considerable pressure, the amount of which is dependent partly on to what degree of kinetic energy is transformed into potential energy, and partly on the distance between the opening of the paring device and the inner surface of the skim milk layer.

I have found that, in order to provide a control that is not too sensitive, it is necessary to place the orifice $h$ at a substantially greater radius (as is shown in the drawing) than that of the skim milk outlet or the inner face of the skim milk in the bowl.

In case a great sensibility of the regulating devices is desired, and at the same time provide for adapting the bowl for taking out a thick as well as a thin cream, provision should be made to regualte the size of the openings or their distance from the axis of rotation. This can be done by providing, in the outlet openings, exchangeable nozzles which may be adjustable radially, or by providing, in or near the openings, adjustable means by which the area of the outlet openings can be changed.

As the cream streams out through a restricted opening at a greater speed than through an overflow-outlet, the openings are desirably directed backwards in relation to the rotation of the bowl, whereby a certain reaction effect is obtained. In this way the actual outstreaming speed is decreased, giving a smaller power consumption and reducing the danger of frothing.

While, as is apparent from the above description, the invention is capable of different embodiments, I have shown, in the drawing, an illustrative construction embodying my invention in a desirable form. The drawing is a vertical sectional view of the upper part of a centrifugal separator wherein a stationary paring device is provded for conveying the heavier separated liquid (e. g., skim milk) to the discharge pipe of a "closed" separator.

$a$ is the cover or top of a centrifugal separator bowl from the peripheral part of which extend channels $b$ through which the heavier separated liquid is discharged into a chamber $c$ mounted on the bowl top. A stationary feed tube $d$ communicates at its top with a funnel $e$, from which, through tube $d$, the liquid mixture to be separated (e. g., whole milk) is fed to the separating space of the bowl. Extending from the feed tube $d$ into the chamber $c$ is a stationary disc-shaped paring device or skimmer $f$, which penetrates the annular body of separated heavier liquid (e. g., skim milk) in chamber $c$. Through channels formed between the upper and lower parts of the paring device $f$ and extending up outside the feed tube $d$ the skim milk is discharged into any suitable receptacle or, if the separator be of the "closed" type, into a tube $g$ which is connected with a pipe (not shown) of the closed system.

Between the upper end of the bowl top $a$ and the chamber $c$ are provided one or more openings within each of which is threaded a nozzle $h$ which is positioned at a substantial distance from the inner wall $x$ of the body of cream which at any given time is contained in the separating chamber of the bowl.

Any suitable means may be provided to insure that the inner zone of outflowing lighter liquid shall not extend outward beyond a given radial distance. Thus the ordinary centrifugal bowl is equipped with a top disc $i$ within the upper neck of which the lighter liquid must flow on its way to the cream discharge, which is usually positioned between the inner edge of the top disc and the feed tube of the bowl. In the construction herein shown the restricted cream outlet is located a substantial distance outside the upper edge of the top disc.

The nozzle $h$ is adjustable in and out to vary the distance between its inner end and the cream level. It will also be understood that the nozzle may be removed and replaced by another nozzle having an orifice of a different area.

What I claim and desire to protect by Letters Patent is:

1. In a centrifugal separator, the combination with the rotatable bowl, a paring chamber above and rotating with the bowl, a conduit between the peripheral part of the separating space of the bowl and said chamber, and a stationary paring device extending into said chamber and through which the heavier separated component, conveyed to said chamber through said conduit, is discharged: of means providing a flow passage for the escape of the lighter separated component, the inner end of which is substantially nearer the axis of rotation than the radius of the parer and is positioned to receive the lighter component separated in the bowl, the outer end of said flow passage having a discharge orifice positioned at a distance from the axis of rotation not substantially less than the radius of the parer and so restricted relative to the inner end of the flow passage and so far outside such inner end as to be always filled with the light component and thereby so substantially unaffected by slight variation in the light liquid component level as to maintain substantially constant the proportions between the two separated components.

2. In a centrifugal separator, the combination with the rotatable bowl, a paring chamber above and rotating with the bowl, a conduit between the peripheral part of the separating space of the bowl and said chamber, a stationary paring device extending into said chamber and through which the heavier separated component, conveyed to said chamber through said conduit, is discharged, and means in the bowl limiting the outward radial extension of the inner level of the lighter separated component outflowing from said separating space: of means providing a radially extending flow passage positioned to receive said lighter separated component adjacent said first means and at the outer end of the flow passage a discharge orifice at a distance from the axis of rotation not substantially less than the radius of the parer and so far outside and distant from said inner level of the lighter separated component outflowing from said separating space and so restricted as to be always filled with light component, thereby preventing substantial variations in the proportions between the two separated components notwithstanding slight variations in the light liquid component level.

3. In a centrifugal separator, the combination with the rotatable bowl, a paring chamber above and rotating with the bowl, a conduit between the peripheral part of the separating space of the bowl and said chamber, a stationary paring device extending into said chamber and through which the heavier separated component, conveyed to said chamber through said conduit, is discharged, and a top disc in the bowl over the inner edge of which the lighter separated component flows upward into the top portion of the bowl chamber; of means providing a radially extending flow passage positioned to receive said lighter separated component adjacent said top disc and at the outer end of the flow passage a discharge orifice at a distance from the axis of rotation not substantially less than the radius of the parer and so far outside and distant from the inner edge of said top disc and so restricted as to be always filled with the light component, thereby preventing substantial variations in the proportions between the two separated components notwithstanding slight variations in the light liquid component level.

4. In a centrifugal separator, the combination with the rotatable bowl, a paring chamber above and rotating with the bowl, a conduit between the peripheral part of the separating space of the bowl and said chamber, a stationary paring device extending into said chamber and through which the heavier separated component, conveyed to said chamber through said conduit, is discharged, and means in the bowl limiting the outward radial extension of the inner level of the lighter separated component outflowing from said separating space: of means providing a radially extending flow passage positioned to receive said lighter separated component adjacent said first means and at the outer end of the flow passage a discharge orifice at a distance from the axis of rotation not substantially less than the radius of the parer and so far outside and distant from said inner level of the lighter separated component outflowing from said separating space and so restricted as to be always filled with light component and to maintain the inner level of the lighter component nearer to the center than said limiting means, thereby preventing substantial variations in the proportions between the two separated components notwithstanding slight variations in the light liquid component level.

HANS OLOF LINDGREN.